UNITED STATES PATENT OFFICE.

EUGENE VON VARGYAS, OF WASHINGTON, DISTRICT OF COLUMBIA, ASSIGNOR TO ACHILLES RUBBER AND TIRE COMPANY, INC., OF BINGHAMTON, NEW YORK, A CORPORATION OF DELAWARE.

RUBBER COMPOSITION.

1,263,297.   Specification of Letters Patent.   Patented Apr. 16, 1918.

No Drawing.   Application filed January 9, 1918.   Serial No. 211,057.

*To all whom it may concern:*

Be it known that I, EUGENE VON VARGYAS, a citizen of the United States, residing at Washington, in the District of Columbia, have invented certain new and useful Improvements in Rubber-Compositions, of which the following is a specification.

The invention relates to rubber compositions.

The invention has for its object to provide an improved rubber composition which possesses greater wear resisting properties than similar compositions heretofore known to me, while retaining all of the natural resilient qualities of rubber. Similarly, it is the intention to produce a rubber composition which is practically immune from the rotting or softening actions of oleaginous substances which come into contact with the rubber.

A further object of the invention is to produce a rubber composition which is capable of withstanding the extreme of heat and cold and which also possesses a texture which offers a maximum resistance to puncture producing objects.

With the above and other objects in view, and such others relating to the details of manufacture as may hereinafter appear, my invention will now be fully set forth and described.

In carrying out the invention in one of its practical forms, twelve ounces of rubber in its uncured state has added thereto from three-fourths to two and one fifth ounces of dry cork flour, from ten and one-fifth to eleven and three-quarters ounces of aluminium flakes and from one and one-fifth to three and one-tenth ounces of raw hide, either in granular, fibrous or gelatinous form. As a matter of preference, I use gelatinous raw-hide.

As a first step, the rubber is reduced to the proper consistency in any suitable manner, which may most feasibly be by the use of a solvent. After this, the cork flour, the raw hide and the aluminium flakes are added and the whole mixed with the rubber into a composition. The composition can then be placed in a mold of any desired shape and can then be vulcanized in any usual or accepted manner. The aluminium flakes, as well as the cork flour are reduced to a very fine powder, but the reduction may vary between certain limits from granulation to powder form without destroying the practicability of the use of the substance in the present composition.

The raw hide is an effective substitute for rubber and properly assimilated with the latter, reduces to a minimum the quantity of rubber which is necessary, thus materially cheapening the cost of the product without destroying or detracting from the desired qualities of resilience. The cork flour constitutes a filler while the aluminium flakes form a binder for the cork and rubber. The resultant composition is a substance which while possessing all of the resilience of natural rubber, posseses greater wear resisting qualities than the natural rubber, not only from frictional action, but also by reason of its ability to withstand the extremes of heat and cold and its resistance to the rotting and softening action of oleaginous substances. Furthermore, it possesses a toughened texture which resists to a high degree the action of puncture producing objects.

What is claimed is:—

1. As a new article of manufacture, a rubber composition consisting of rubber, dry cork flour, powdered aluminium flakes and gelatinous raw hide, the quantity of rubber in the composition by weight being less than the combined weights of the cork flour, aluminium and raw hide.

2. As a new article of manufacture, a rubber composition consisting of twelve ounces of rubber, three-fourths to two and one fifth ounces of dry cork flour, ten and one-fifth to eleven and three-fourths ounces of powdered aluminium flakes, and one and one-fifth to three and one-tenth ounces of gelatinous raw hide.

In testimony whereof I affix my signature.

EUGENE VON VARGYAS.